US009299191B2

(12) United States Patent
Sinram et al.

(10) Patent No.: US 9,299,191 B2
(45) Date of Patent: Mar. 29, 2016

(54) ADAPTIVE ARTIFACT REMOVAL

(71) Applicant: Google Inc., Mountain View, CA (US)

(72) Inventors: Olaf Sinram, Dublin, CA (US); Jamie Adams, San Ramon, CA (US)

(73) Assignee: Google Inc., Mountain View, CA (US)

( * ) Notice: Subject to any disclaimer, the term of this patent is extended or adjusted under 35 U.S.C. 154(b) by 343 days.

(21) Appl. No.: 13/905,699

(22) Filed: May 30, 2013

(65) Prior Publication Data

US 2015/0154738 A1 Jun. 4, 2015

Related U.S. Application Data

(60) Provisional application No. 61/655,138, filed on Jun. 4, 2012.

(51) Int. Cl.
*G06T 17/05* (2011.01)

(52) U.S. Cl.
CPC ..................... *G06T 17/05* (2013.01)

(58) Field of Classification Search
None
See application file for complete search history.

(56) References Cited

U.S. PATENT DOCUMENTS

| 4,698,759 | A | 10/1987 | Eliason et al. | |
| 5,926,581 | A | 7/1999 | Pritt | |
| 6,012,057 | A * | 1/2000 | Mayer et al. | |
| 6,600,485 | B1 * | 7/2003 | Yoshida et al. | 345/419 |
| 7,912,296 | B1 * | 3/2011 | Zelinka et al. | 382/209 |
| 8,060,352 | B2 | 11/2011 | Kelley et al. | |
| 8,155,391 | B1 * | 4/2012 | Tang et al. | 382/113 |
| 2002/0181751 | A1 * | 12/2002 | Hale | 382/128 |
| 2003/0117392 | A1 * | 6/2003 | Harvill | 345/419 |
| 2005/0058074 | A1 * | 3/2005 | Newman | 370/241 |
| 2006/0013442 | A1 | 1/2006 | McDowall et al. | |
| 2006/0262117 | A1 | 11/2006 | Chiba | |
| 2008/0247622 | A1 * | 10/2008 | Aylward et al. | 382/131 |
| 2009/0125907 | A1 * | 5/2009 | Wen et al. | 718/101 |
| 2009/0304236 | A1 | 12/2009 | Francini et al. | |
| 2010/0182316 | A1 | 7/2010 | Akbari et al. | |
| 2012/0209526 | A1 * | 8/2012 | Imhof | 702/5 |
| 2013/0148893 | A1 * | 6/2013 | Markham et al. | 382/190 |

OTHER PUBLICATIONS

Pitas, I., and C. Kotropoulos, "Texture analysis and segmentation of seismic images," Acoustics, Speech, and Signal Processing, 1989 ICASSP-89., 1989 International Conference on. IEEE, 1989.*
"Flood Fill" [online]. [Retrieved May 10, 2012] Retrieved from the internet: http://en.wikipedia.org/wiki/Flood_fill, 8 pages.
"Kauring Airborne Gravity Test Site" [online]. [Retrieved May 4, 2012] Retrieved from the Internet: http://www.ga.gov.au/minerals/projects/current-projects/kauring.html, 4 pages.

* cited by examiner

*Primary Examiner* — Michelle Entezari
(74) *Attorney, Agent, or Firm* — Lerner, David, Littenberg, Krumholz & Mentlik, LLP

(57) ABSTRACT

Aspects of the disclosure relate to generating a digital terrain model ("DTM") from a digital surface model ("DSM"). For example, the DSM may include a plurality pixels associated with coordinate information and elevation information, including the elevation of features such as buildings and large vegetation. Initially, a set of vertices defining a polygon may be identified. A set of seed pixels, corresponding to points of the DSM of "bare" earth (without buildings or large vegetation) may also be identified. These may be the same or different from the set of vertices. An adaptive flood filler algorithm is used to evaluate the pixels of the polygon starting with the seed pixels. This process validates or invalidates the state of the pixels. The result is an approximation of a DTM for the polygon.

20 Claims, 10 Drawing Sheets

FIGURE 4

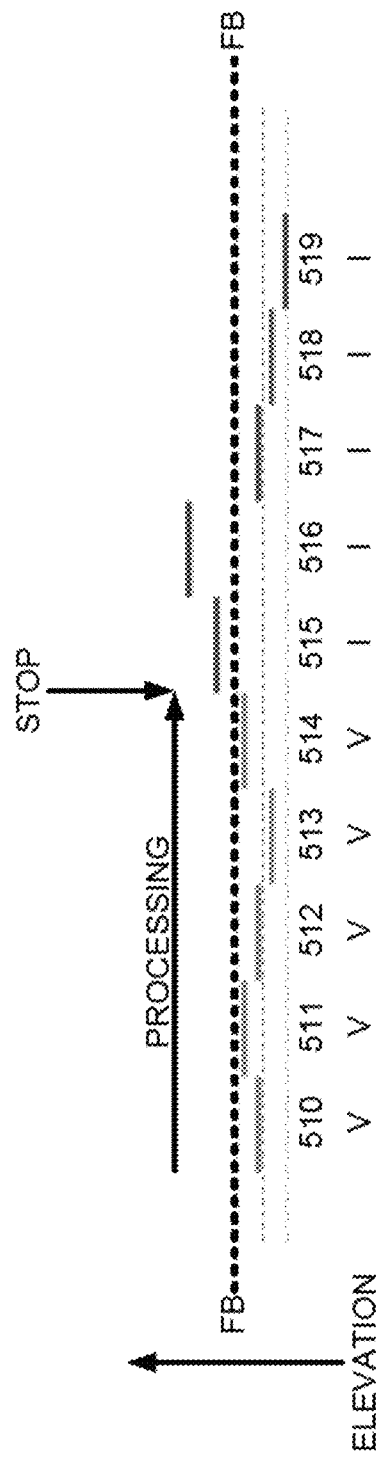

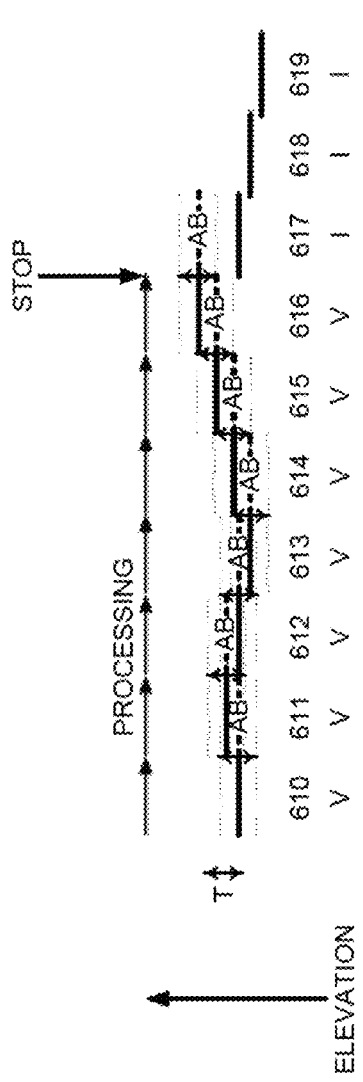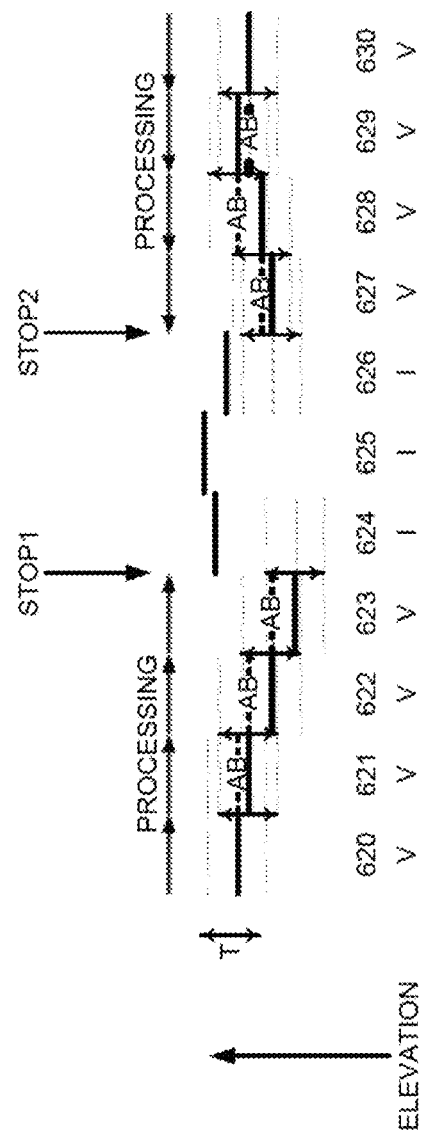

ADAPTIVE ARTIFACT REMOVAL

CROSS REFERENCE TO RELATED APPLICATION

The present application claims the benefit of the filing date of U.S. Provisional Patent Application No. 61/655,138 filed Jun. 4, 2012, the entire disclosure of which is hereby incorporated herein by reference.

BACKGROUND

Digital models of the earth are usually derived using some sort of visual data source, images forming stereo pairs, or LIDAR. Visual approaches of terrain extraction produce the visible surface. This visible surface may include some parts of the ground surface as well as other features or artifacts such as buildings, vehicles, vegetation, etc. These models are called digital surface models ("DSM").

However, in some examples the visible surface may not be desired. For example, it may be important to have a model or map of an area that does not include artifacts such as those listed above, but rather, the elevation of the bare earth. This type of model is called a digital terrain model ("DTM").

Generating a DTM from a DSM can be challenging. It requires removing artifacts from a DSM and interpolating the elevation of the earth without those artifacts. Various systems attempt to remove these artifacts automatically. For example, some systems may remove buildings by specifying the terrain elevation of the surrounding land (for example, using a typical flood filler algorithm) and removing or interpolating (for example, using a hole-filler algorithm) values above that elevation. However, that approach assumes that the surrounding land is flat and will be less useful on sloped terrain.

SUMMARY

One aspect of the subject matter described herein provides a method. The method includes accessing a digital surface model including a plurality of pixels. Each pixel of the plurality of pixels includes location information and elevation information. The method also includes identifying a set of vertex pixels defining a polygon include a subset of pixels of the plurality of pixels. The method includes identifying a matrix of the subset of pixels. Each pixel of the matrix is initially invalidated. The method also includes identifying a set of seed pixels proximate to a surface of the earth. The method also includes, starting at a neighboring pixel of each seed pixel of the set of seed pixels, evaluating, by a processor, the subset of pixels. Evaluating the subset of pixels includes, when the elevation of a previously evaluated pixel of the subset of pixels is within a tolerance criterion of an elevation of a neighboring pixel of the previously evaluated pixel of the subset of pixels, validating the neighboring pixel of the previously evaluated pixel of the subset of pixels in the matrix. Evaluating the pixels also includes, when the elevation of a previously evaluated pixel of the subset of pixels is not within a tolerance criterion of an elevation of a neighboring pixel of the previously evaluated pixel of the subset of pixels, leaving the neighboring pixel of the previously evaluated pixel of the subset of pixels as invalid in the matrix. The method includes generating an approximation of a digital terrain model based on the matrix.

In one example, the subset of pixels are evaluated using a flood filler algorithm. In another example, generating the digital surface model includes, subsequent to evaluating the subset of pixels, interpolating the elevation of any invalidated pixels of the matrix. In a further example, a particular pixel's neighboring pixel is directly adjacent to the particular pixel and not diagonally adjacent to the particular pixel. In yet another example, the subset of pixels are evaluated in straight lines beginning with each vertex pixel of the set of vertex pixels and once a pixel of the straight line is left as invalid in the matrix, leaving the remaining pixels that are both of the straight line and the subset of pixels as invalid in the matrix. In still a further example, generating the digital surface model includes, subsequent to evaluating the subset of pixels, using a flood filler algorithm to interpolate any pixels of the matrix that are invalid to generate a digital surface model. In another example, the method also includes adjusting the tolerance criterion to increase the number of pixels that are validated in the matrix. In a further example, the method also includes adjusting the tolerance criterion to decrease the number of pixels that are validated in the matrix. In yet another example, the set of seed pixels is identified from the set of vertex pixels. In still a further example, the method also includes validating the pixels of the set of seed pixels in the matrix.

One aspect of the subject matter described herein provides a system. The system includes memory storing a digital surface model including a plurality of pixels. Each pixel of the plurality of pixels including location information and elevation information. The system also includes a processor configured to access the memory. The processor is also configured to identify a set of vertex pixels defining a polygon include a subset of pixels of the plurality of pixels; identify a matrix of the subset of pixels, wherein each pixel of the matrix is initially invalidated; identify a set of seed pixels proximate to a surface of the earth; and starting at a neighboring pixel of each seed pixel of the set of seed pixels, evaluate the subset of pixels. The processor is configured to evaluate the subset of pixels by, when the elevation of a previously evaluated pixel of the subset of pixels is within a tolerance criterion of an elevation of a neighboring pixel of the previously evaluated pixel of the subset of pixels, validating the neighboring pixel of the previously evaluated pixel of the subset of pixels in the matrix. The processor is also configured to evaluate the subset of pixels by, when the elevation of a previously evaluated pixel of the subset of pixels is not within a tolerance criterion of an elevation of a neighboring pixel of the previously evaluated pixel of the subset of pixels, leaving the neighboring pixel of the previously evaluated pixel of the subset of pixels as invalid in the matrix. The processor is also configured to generate an approximation of a digital terrain model based on the matrix.

In one example, the processor is also configured to evaluate the subset of pixels by using a flood filler algorithm. In another example, the processor is also configured to generate the digital surface model by, subsequent to evaluating the subset of pixels, interpolating the elevation of any invalidated pixels of the matrix. In yet another example, a particular pixel's neighboring pixel is directly adjacent to the particular pixel and not diagonally adjacent to the particular pixel. In a further example, the processor is also configured to evaluate the subset of pixels in straight lines beginning with each vertex pixel of the set of vertex pixels and once a pixel of the straight line is left as invalid in the matrix, leaving the remaining pixels that are both of the straight line and the subset of pixels as invalid in the matrix. In still a further example, the processor is also configured to generate the digital surface model by, subsequent to evaluating the subset of pixels, using a flood filler algorithm to interpolate any pixels of the matrix that are invalid to generate a digital surface model. In yet another example, the processor is also configured to adjust the tolerance criterion to increase the number of pixels that are validated in the matrix. In another example, the processor is configured to identify the set of seed pixels from the set of vertex pixels. In a further example, the processor is also configured to validate the pixels of the set of seed pixels in the matrix.

One aspect of the subject matter described herein provides a non-transitory, tangible computer-readable storage medium on which computer readable instructions of a program are stored. The instructions, when executed by a processor, cause the processor to perform a method. The method includes accessing a digital surface model including a plurality of pixels. Each pixel of the plurality of pixels includes location information and elevation information. The method also includes identifying a set of vertex pixels defining a polygon include a subset of pixels of the plurality of pixels. The method includes identifying a matrix of the subset of pixels. Each pixel of the matrix is initially invalidated. The method also includes identifying a set of seed pixels proximate to a surface of the earth. The method also includes, starting at a neighboring pixel of each seed pixel of the set of seed pixels, evaluating, by a processor, the subset of pixels. Evaluating the subset of pixels includes, when the elevation of a previously evaluated pixel of the subset of pixels is within a tolerance criterion of an elevation of a neighboring pixel of the previously evaluated pixel of the subset of pixels, validating the neighboring pixel of the previously evaluated pixel of the subset of pixels in the matrix. Evaluating the pixels also includes, when the elevation of a previously evaluated pixel of the subset of pixels is not within a tolerance criterion of an elevation of a neighboring pixel of the previously evaluated pixel of the subset of pixels, leaving the neighboring pixel of the previously evaluated pixel of the subset of pixels as invalid in the matrix. The method includes generating an approximation of a digital terrain model based on the matrix.

BRIEF DESCRIPTION OF THE DRAWINGS

FIG. 4 is a diagram of example pixels in accordance with aspects of the subject matter described herein.

FIG. 5 is a diagram of example data in accordance with aspects of the subject matter described herein.

FIGS. 6A and 6B are diagrams of example data in accordance with aspects of the subject matter described herein.

DETAILED DESCRIPTION

Figure 1A:
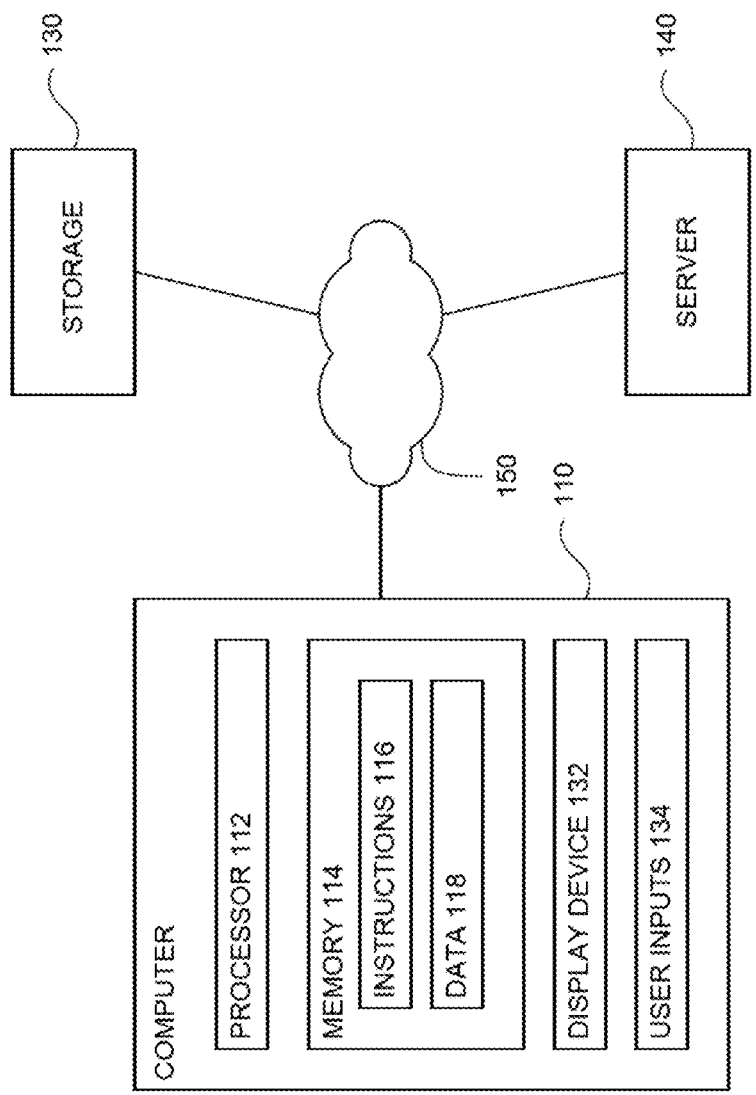
FIG. 1A is a functional diagram of a system in accordance with aspects of the subject matter described herein.
Figure 1B:
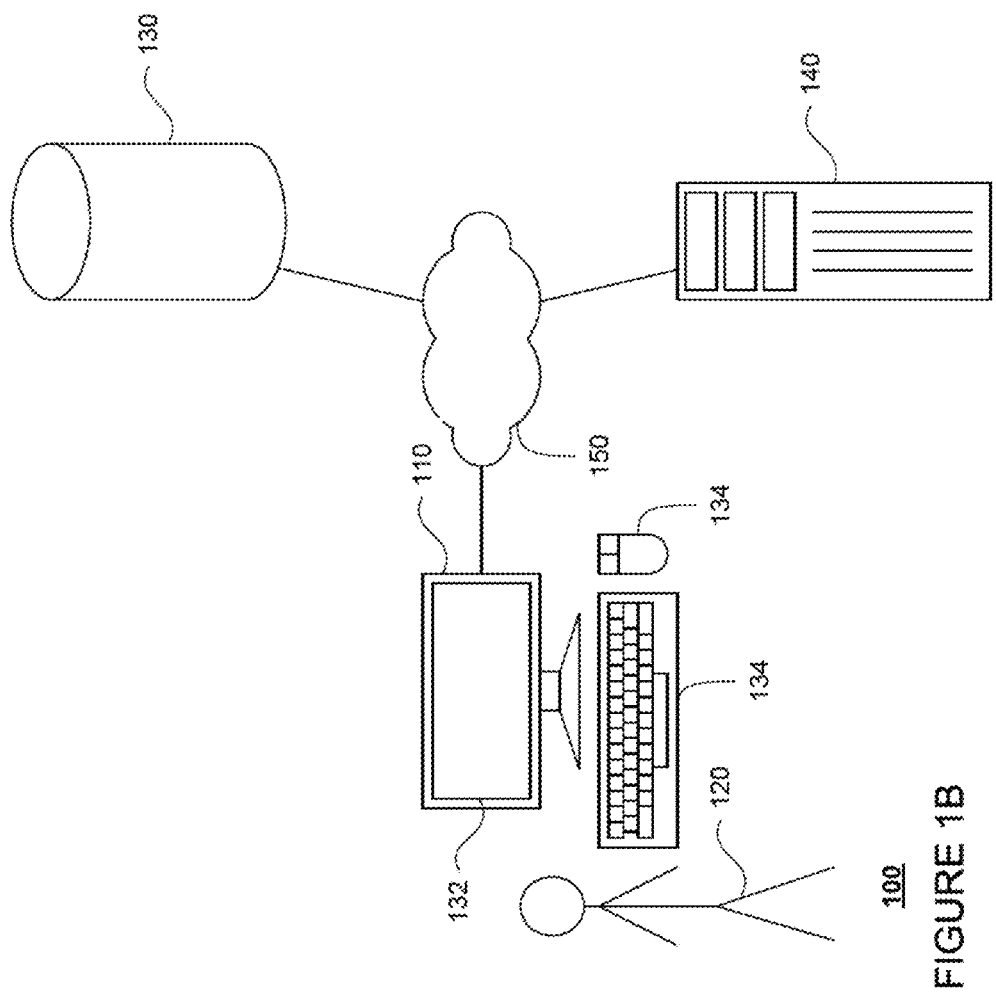
FIG. 1B is a pictorial diagram of the system of FIG. 1A.

As shown in FIGS. 1A and 1B, an example system 100 may include a computer 110. Computer 110 may contain a processor 112, memory 114 and other components typically present in general purpose computers. Memory 114 of computer 110 may store information accessible by processor 112, including instructions 116 that may be executed by the processor 112.

Memory may also include data 118 that may be retrieved, manipulated or stored by the processor. The memory may be of any type capable of storing information accessible by the processor, such as a hard-drive, memory card, ROM, RAM, DVD, CD-ROM, write-capable, and read-only memories.

The instructions 116 may be any set of instructions to be executed directly, such as machine code, or indirectly, such as scripts, by the processor. In that regard, the terms "instructions," "application," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 118 may be retrieved, stored or modified by processor 112 in accordance with the instructions 116. For instance, although the subject matter described herein is not limited by any particular data structure, the data may be stored in computer registers, in a relational database as a table having many different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories such as at other network locations, or information that is used by a function to calculate the relevant data.

The processor 112 may be any conventional processor, such as commercially available CPUs. Alternatively, the processor may be a dedicated device such as an ASIC or other hardware-based processor. Although FIG. 1A functionally illustrates the processor, memory, and other elements of computer 110 as being within the same block, the processor, computer, or memory may actually comprise multiple processors, computers, or memories that may or cannot be stored within the same physical housing. For example, memory may be a hard drive or other storage media located in a housing different from that of computer 110, such as at storage device 130 described below. Accordingly, references to a processor, computer, or memory will be understood to include references to a collection of processors, computers, or memories that may or cannot operate in parallel.

In one example, computer 110 may include a personal computer, intended for use by a user 120 (FIG. 1B), having all the components normally found in a personal computer such as a display device 132, CD-ROM, hard-drive, user inputs 134, speakers, modem and/or network interface device, and all of the components used for connecting these elements to one another. The display device 132 may include, for example, a monitor having a screen, a projector, a touchscreen, a small LCD screen, a television, or another device such as an electrical device that is operable to display information processed by the processor. The user inputs 134 may include, for example, a mouse, keyboard, touch-screen or microphone. Moreover, computers in accordance with the systems and methods described herein may comprise any device capable of processing instructions and transmitting data to and from humans and other computers including general purpose computers, PDAs, network computers lacking local storage capability, and other networked devices.

The computer 110 may be at one node of a network 150 and capable of directly and indirectly communicating with other nodes, such as storage device 130 or computer 140. Storage device may include a database, database server, or other networked storage configuration for long term storage of data. Computer 140 may be configured similarly to computer 110 with a processor, memory, and instructions. The network 150 and intervening nodes described herein, may be interconnected using various protocols and systems, such that each may be part of the Internet, World Wide Web, specific intranets, wide area networks, or local networks. These may use standard communications protocols or those proprietary to one or more companies, Ethernet, WiFi and HTTP, and various combinations of the foregoing.

Although the computers 110 and 140 may comprise full-sized personal computers, the subject matter described herein may also be used in connection with mobile devices capable of wirelessly exchanging data with a server over a network such as the Internet. By way of example only, computer 110 may be a wireless-enabled PDA, tablet PC, netbook, or a cellular phone capable of obtaining information using the Internet. The user may input information, for example, using a small keyboard, a keypad, or a touch screen.

In another alternative, computers 110 or 140 may be a web server capable of communicating with various client devices at different nodes of a network. In this regard, servers 110 or 140 may also include many computers, e.g., a load balanced server farm, that exchange information with different nodes of a network for the purpose of receiving, processing and transmitting data to the client devices. In this instance, the client devices will typically still be at different nodes of the network than any of the computers of server 110 or 140.

Returning to FIG. 1A, instructions 116 may include various algorithms. For example, the instructions 116 my include an adaptive flood filler algorithm for validating or invalidating pixels based on an adaptive base value as described in more detail below. In addition, instructions 116 may include a hole filler algorithm for interpolating the values of invalidated pixels. A hole filler algorithm may attempt to insert values where none exist based on an estimate of surrounding existing values. This is known as interpolating or even extrapolating. As the hole filled values are guesses, there can be no guarantee of their accuracy.

The data 118 of computer 110 may include all or a part of one or more DSMs. Alternatively, the DSMs may be stored at storage devices 130 or 140 and accessed by computer 110 over network 150. In this regard, computer 110 may request and receive all or a portion of the DSMs and store the DSM in data 118 for processing.

Figure 2:
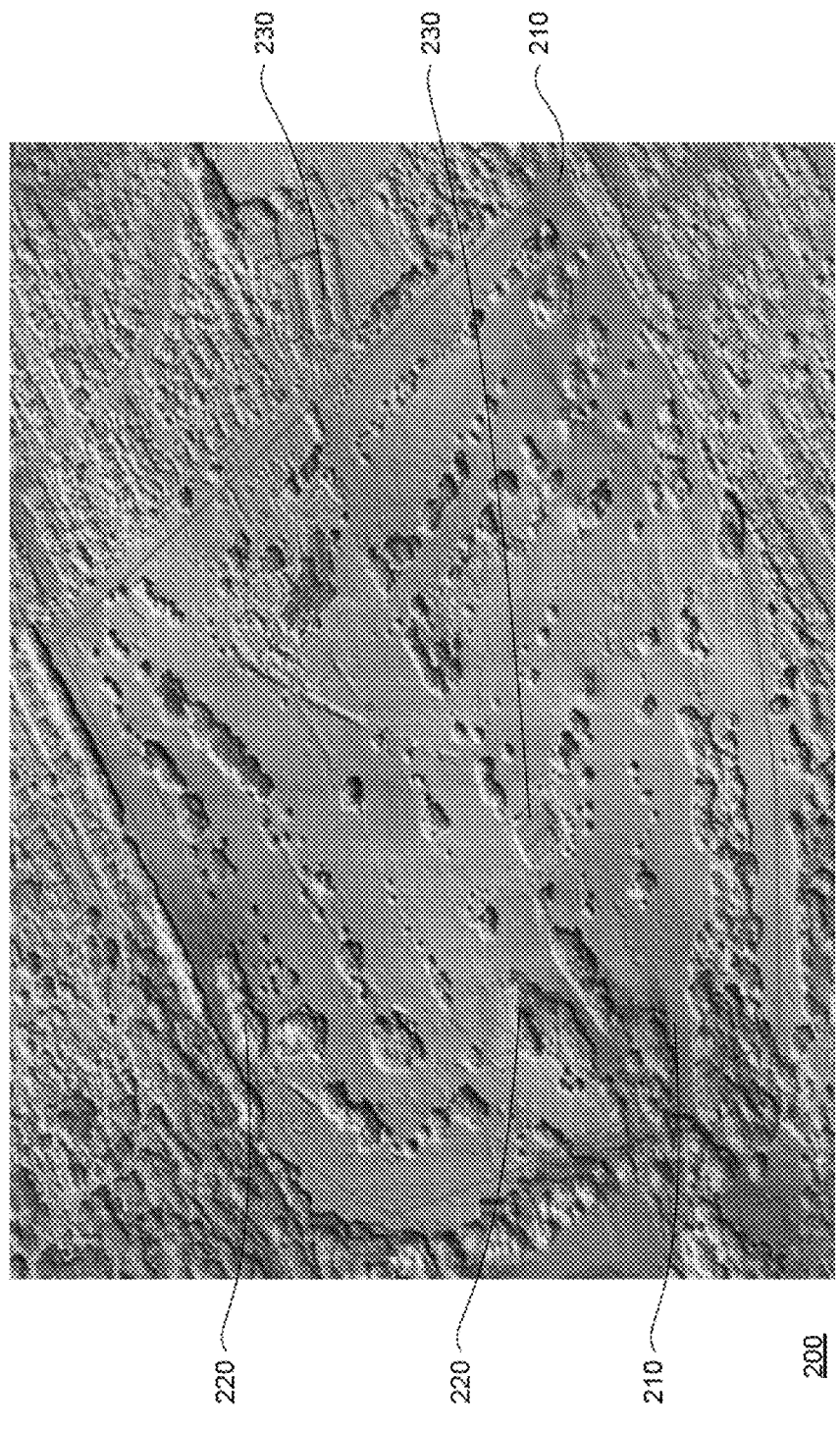
FIG. 2 is an image of an example DTM in accordance with aspects of the subject matter described herein.

Each DSM may include a plurality of pixels that may be used to generate a 3D image of terrain. Again, as noted above, a DSM may include artifacts, such as buildings, vegetation, vehicles, etc. Each pixel may include coordinate information representing a location. For example, a pixel may include latitude and longitude coordinates or other location data representing its location relative to some geo-coordinate system. In addition, each pixel may include elevation information representing the elevation of that coordinate location. The image 200 of FIG. 2 is an example of a portion of a DSM shown in a bird's eye view. In this example, image 200 is made up of a plurality of pixels and includes various areas of bare earth 210 as well as vegetation 220 and buildings 230. Again the pixels of image 200 include both coordinate data as well as elevation data.

The computer 110 may also generate and/or store matrix data. For example, the matrix data may include a Boolean matrix having two values, such as 0 or 1, for each pixel for all or a portion of a DSM.

As described in more detail below, computer 110 may generate a DTM from a DSM. The DTM may then be stored locally at computer 110 or sent via network 150 to the storage device 130 or server 140 for long term storage.

Although certain advantages are obtained when information is transmitted or received as noted above, other aspects of the subject matter described herein are not limited to any particular manner of transmission of information. For example, in some aspects, information may be sent using a medium such as a disk, tape, flash-drive, or CD-ROM. Yet further, although some functions are indicated as taking place on a single computer having a single processor, various aspects of the subject matter described herein may be implemented by a multiple of computers, for example, communicating information over network 150.

In addition to the operations described below and illustrated in the figures, various operations will now be described. It should also be understood that the following operations do not have to be performed in the precise order described below. Rather, various steps may be handled in a different order or simultaneously. Steps may also be omitted unless otherwise stated.

Computer 110 may identify a set of vertices defining a polygon. For example, a user, such as user 120, may input the set of vertices at a user input 134 by selecting points or pixels of image 200. In some examples, these pixels may include or may be close to "bare" earth (without buildings or large vegetation). Computer 110 may then connect the vertices to trace a polygon. By inputting the vertices, the user 120 may define a polygon encompassing a plurality of pixels of image 200 to be processed. Alternatively, rather than user input, the polygon may be defined by looking to other geographic data. For example, if street data is available, such as where road data is stored as a collection of vectors, several points along one or more roads may be used as a set of vertices. In some examples, however, this may be less reliable as roads may be occluded by overhanging trees, cars, building shadows, etc. In such cases, it may be helpful to have a user input the vertices.

Figure 3:
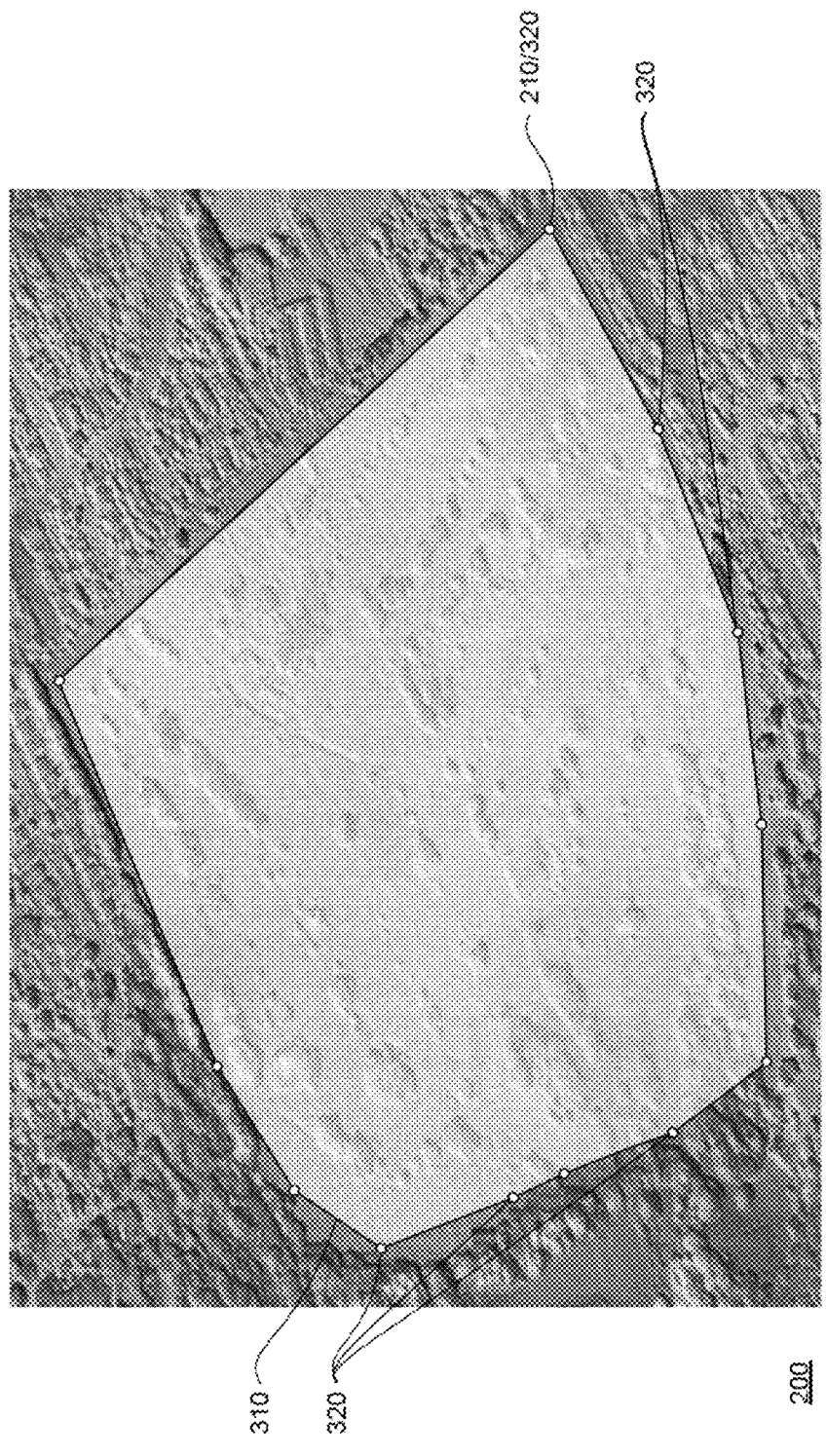
FIG. 3 is another image of an example DTM in accordance with aspects of the subject matter described herein.

FIG. 3 depicts an example polygon 310 defined by a set of vertices 320 (exaggerated in the example for clarity). As noted above the vertices 320 may correspond to areas of bare earth identified by user 120.

Computer 110 may also identify a set of seed pixels. These seed pixels may define areas or points that are close to or include bare earth that will be used as initial pixels for a flood filler algorithm (as described in more detail below). Again this data may be input by a user or determined by a computer (such as in the example of the street data vertices described above). In other words, a user may input a set of vertices of a polygon to define the processing region as well as a list or set of isolated vertices of length [1 ... n] that defines a set of seed pixels. However, if the vertices of the polygon include or are close to bare earth, the vertices of the polygon may also be used as the seed pixels. This may be somewhat more convenient as a user is required to input less data. Thus, in the example of FIG. 3, the set of vertices 320 may also be used as the set of seed pixels.

The computer may then generate or access a matrix for the pixels of the polygon. Each pixel of the matrix corresponds to a pixel in the original terrain matrix. In one example, the matrix may include a Boolean matrix initialized with every pixel set to the same value (0 or 1), false or true, invalid or valid, etc. For example, all of the pixels of the matrix may be set to false or invalid.

Computer 110 may then use the set of seed pixels for evaluation by a flood filler algorithm. The typical flood filler algorithm simply compares each data point to a fixed base criterion. The flood filler may move in straight lines, processing each adjacent data point one at a time. The result is that data points that satisfy the criterion are validated in the matrix and data points do not satisfy the criterion are invalidated in the matrix. The flood filler may stop moving in a particular direction when it identifies a data point that does not meet the criteria, and the remaining data points past the invalidate data point may be ignored (remain invalidated).

Figure 4:
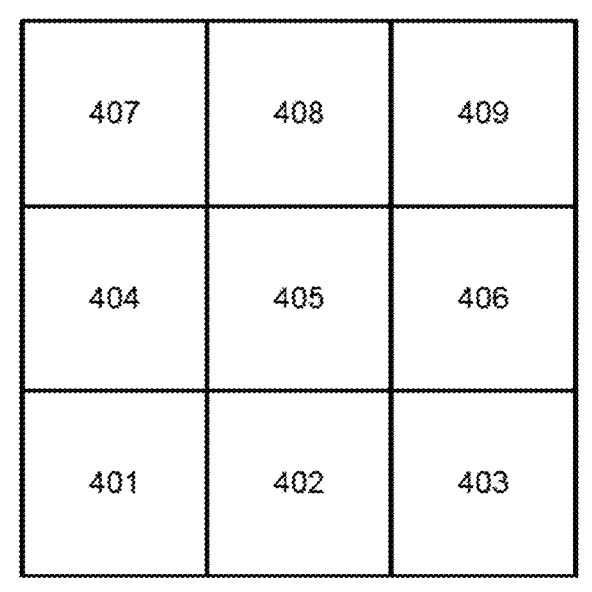

FIG. 4 depicts an example set of data points, here pixels 401-09. In this example, each box represents a pixel. Each pixel has 8 total neighboring pixels. Including 4 directly adjacent neighboring pixels and 4 diagonally adjacent neighboring pixels. For example, data point 405 has 4 directly adjacent neighbors, including pixels 402, 404, 408, and 406. Pixels 401, 407, 409, and 403 are diagonally adjacent to pixel 405. The flood filler algorithm may move in straight lines, processing pixel 402 then 405 then 408 (or in reverse order) or processing pixel 404 then 405 then 406 (or in reverse order). Alternatively, the flood filler algorithm may move in diagonal lines, processing pixel 407 then 405 then 403 (or in reverse order) or processing pixel 401 then 405 then 409 (or in revise order). In another example, rather than processing 4 diagonally adjacent or directly adjacent pixels, the flood filler may process all 8 neighbors of a pixel. In addition, for example, if the floor filler is moving in the direction of pixels 402, 405, and 408, and the flood filler validates pixel 402, but invalidates pixel 405, the flood filler may stop at pixel 405 and not evaluate pixel 408.

FIG. 5 depicts a set of pixels 510-519 and processing using a typical flood filler algorithm in 1-dimension. In this example, these pixels may be diagonally or directly adjacent neighboring pixels. As shown in FIG. 5, pixels with an elevation above the fixed base value (FB) are invalidated (I), those below are validated (V). The flood filler moves in the direction of the processing arrow and then stops at the pixel that does not meet the threshold criterion, here at pixel 515. Thus, the remaining data points, or pixels 516-19 remain invalidated in the matrix. Those pixels that do not meet the threshold criterion are usually replaced or filled by some other value, the validated pixels are left at their original value. This typical approach assumes a flat surface, however if there is a gradient or slope, this approach may not be useful.

An adaptive flood filler algorithm may provide significant improvement when working with graded or sloping areas. For example, using an adaptive flood filler algorithm may be used to evaluate data points by comparing values with a previously visited adjacent data point. The adaptive flood filler algorithm does not utilize a fixed singular base value as the typical approach, but instead adapts the base value from one data point to an adjacent data point. In other words, the base value may be replaced for each data point by the value of the previously visited neighboring data point. Again, once the flood filler algorithm evaluates a data point and determines it to be invalid, the flood filler stops moving in the direction of the invalidated data point.

The adaptive flood filler algorithm may consider various criteria. In one example, the criterion may relate to a difference in slope. In this example, the flood filler algorithm may compare a difference in slope between the slope a first pixel and a previously evaluated neighboring pixel and the slope of the previously evaluated neighboring pixel and a neighboring pixel of the neighboring pixel. In another example, the criterion may include a difference in elevation values between a first pixel and a previously evaluated pixel with respect to the metric distance of the two pixels, making this criterion scale dependent. In another example, the adaptive flood filler algorithm may compare elevation values between a first pixel and a previously evaluated neighboring pixel of the first pixel. If the difference between the elevations is less than a tolerance value, the pixel is validated in the matrix. If the difference is greater than the tolerance value, the pixel is invalidated in the matrix. The neighbor of an invalidated pixel which is not also the neighbor of a validated pixel is not evaluated by the flood filler algorithm and thus left invalid. Although the examples and FIGURES provided herein relate to a difference in elevation value as the criterion, various other criterions (such as those identified above) may also be used).

FIG. 6A depicts a set of pixels 610-619 and processing using an adaptive flood filler algorithm in 1-dimension. As shown in FIG. 6A, rather than being compared to a fixed base value, the elevation of each pixel is compared to the elevation of its previously evaluated neighboring pixel. For example, pixel 610 may be a seed pixel or vertex of the polygon. This pixel is immediately validated (V). In other words, it has already been identified as being at or close to bare earth. The processing may then move to pixel 621. The elevation of pixel 611 is compared to an adaptive base value (AB) or here, the elevation of pixel 610. As the elevation of pixel 611 is within the tolerance criterion (T) the adaptive base value (AB), pixel 611 is validated.

This process continues with each pixel until the adaptive flood filler algorithm identifies an invalidated (I) pixel. For example, the elevation of pixel 617 may be compared to the adaptive base value of its neighboring pixel, or the elevation of pixel 616. Here, the elevation difference is greater than the tolerance criterion (T) and pixel 617 is invalidated (I) in the matrix. Thus, the remaining data points, or pixels 618 and 619, are not evaluated and remain invalidated (I) in the matrix.

Again, the adaptive flood filler is initiated at each seed pixel. For example, the adaptive flood filler may begin with each vertex of the polygon. The adaptive flood filler continues to visit each of the neighboring pixels of the seed pixels that are also within the polygon until the difference in the relevant criterion from one pixel to its neighbor is greater than the tolerance criterion and the process stops. In this regard, the adaptive flood filler continues along in a particular direction until the neighboring pixel of an evaluated pixels has been invalidated. The adaptive flood filler is not a global operator, but works from each vertex outwards, step by step for as long as there is a positive (validating) response from the comparison of the relevant criterion value of a pixel to the adaptive base value for that criterion.

The present disclosure provides for several seed pixels, so that even if the adaptive flood filler stops at a particular pixel, it can continue with another seed pixel, for example, at a different corner of the edit region. For example, if a polygon is divided into two areas by a building and there is a seed pixel or vertex on either side of the building, the adaptive flood filler may evaluate pixels on both sides of the building. Since the adaptive flood filler accommodates the use of multiple seed pixels or vertices, it is simply a UI problem to be able to supply points in the center of a structure for isolated flood filling inside an otherwise closed area. For example, to accurately define the surface of an open air sporting arena stadium one or more additional seed pixels may be identified at the interior of the arena.

FIG. 6B depicts how multiple seed pixels or vertices can enhance the efficiency for the purpose of artifact isolation (and thus removal). For example, pixels 620 and pixel 630 may be seed pixels or vertices of the polygon. These pixels are immediately validated (V). In other words, these pixels have already been identified as being at or close to bare earth. The processing may then move from pixel 620 to pixel 621 and from pixel 630 to pixel 629. The elevation of pixel 621 is compared to an adaptive base value (AB) from the previously evaluated neighboring pixel, here, the elevation of pixel 620. Similarly, the elevation of pixel 629 is compared to an adaptive base value (AB) from the previously evaluated neighboring pixel, here, the elevation of pixel 630. As the elevation of pixel 621 is within the tolerance criterion (T) the adaptive base value (AB) from pixel 620, pixel 621 is validated. Similarly, the elevation of pixel 629 is within the tolerance criterion (T) the adaptive base value (AB) from pixel 630, so pixel 629 is validated.

This process continues with each pixel until the adaptive flood filler algorithm identifies an invalidated (I) pixel. For example, the elevation of pixels 624 and 626 may be compared to the adaptive base value of their neighboring pixels, or the elevation of pixels 623 and 627, respectively. Here, the elevation differences are greater than the tolerance criterion (T) and pixels 623 and 627 are invalidated (I) in the matrix. Thus, the remaining data points, or pixel 615, are not evaluated and remain invalidated (I) in the matrix.

After the adaptive flood filler has processed the pixels of the polygon as described above, the matrix may identify the pixels as validated or invalidated. The number of pixels that are validated or invalidated is a result of the tolerance criterion described above. The tolerance criterion may be adjusted by the user in order to increase or decrease the accepted change in the terrain (or the number of pixels that are invalidated in a given polygon). A higher tolerance allows for more sloped terrain, but is likely to include artifacts, while a lower tolerance will remove not only artifacts, but also stop at some slopes.

Figure 7A:
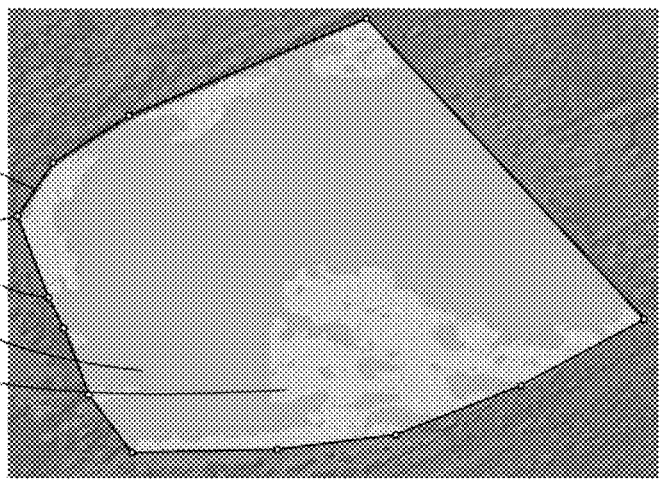
FIGS. 7A, 7B, and 7C are further diagrams of example data in accordance with aspects of the subject matter described herein.
Figure 7B:
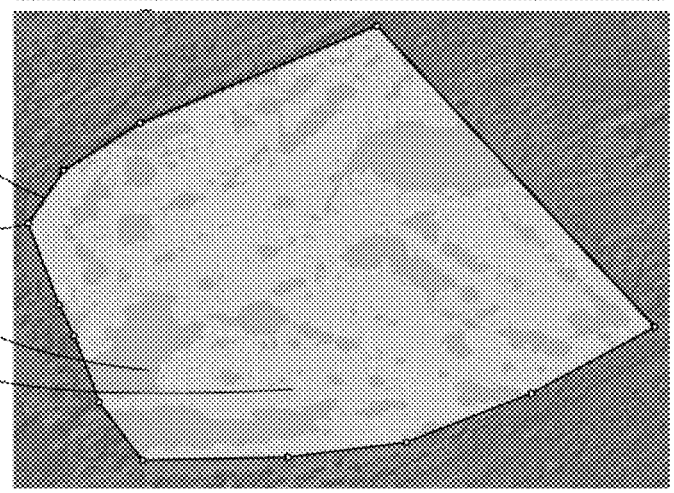
Figure 7C:
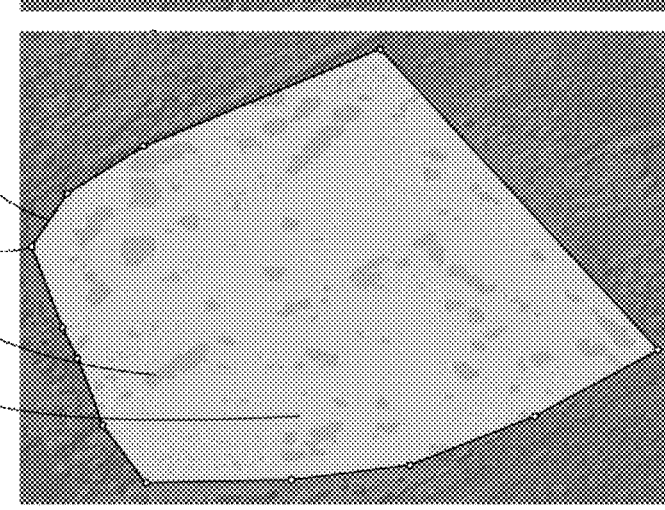

FIGS. 7A-7C provide an example of this concept for the polygon 310 of image 200. Each of these figures depicts the invalidated pixels 710 (darker shaded areas of polygon 310) and validated pixels 720 (lighter shaded areas of polygon 310 for different tolerance values. Specifically, in the examples of FIGS. 7A-7C the tolerance criteria were set to 0.2 meters, 0.4 meters, and 1.0 meters, respectively. In each of these examples, the ratio of validated pixels to invalidated pixels increases as the tolerance criterion increases.

The elevation of any validated pixels may be set or otherwise remain the original elevation of the DTM. A hole filler algorithm is then used to interpolate the elevation of the invalidated pixels for the polygon. As the invalidated pixels may be surrounded by original elevation points (except in the edges of the polygon), the result of the hole filler algorithm may provide an approximation of a DSM for the polygon.

Figure 8A:
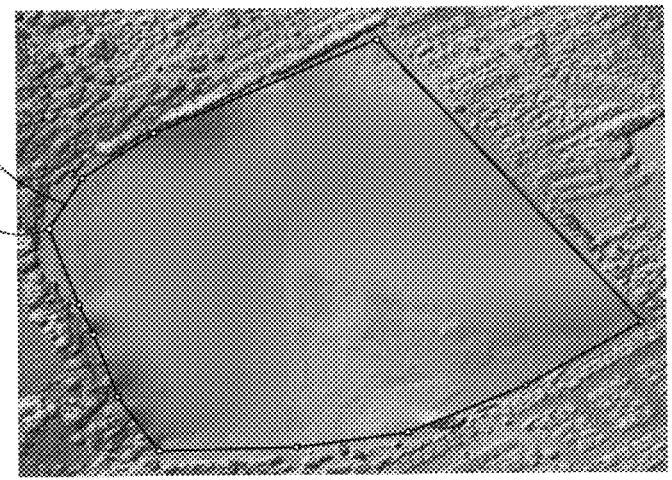
FIGS. 8A, 8B, and 8C are additional diagrams of example data in accordance with aspects of the subject matter described herein.
Figure 8B:
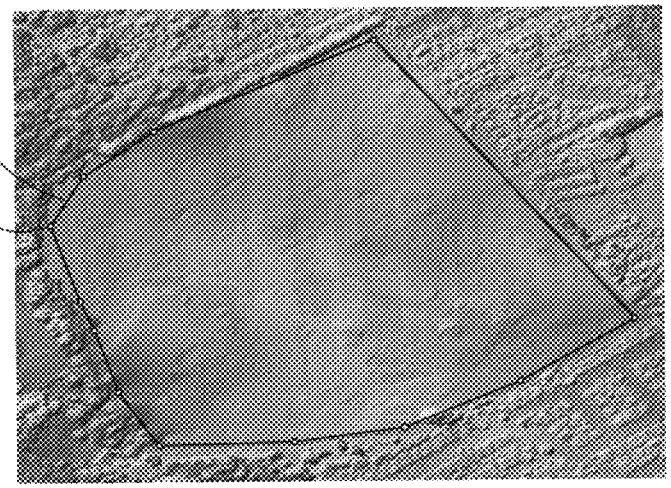
Figure 8C:
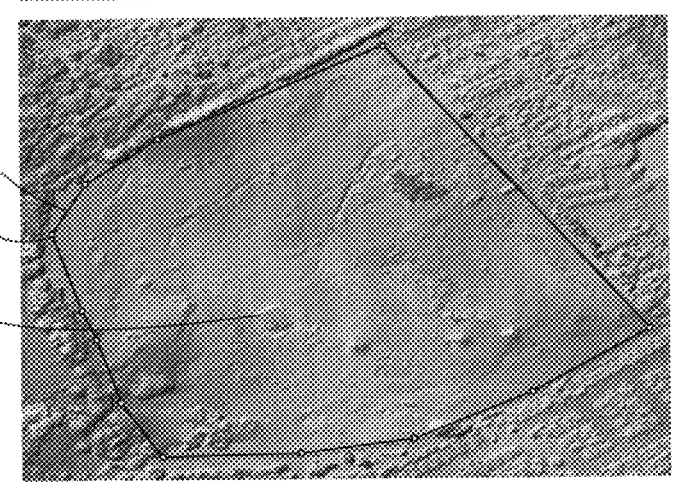

FIGS. 8A-8C provide an example of the results of the hole filling algorithm for each of the tolerance criteria of FIGS. 7A-7C, specifically, 0.2 meters, 0.4 meters, and 1.0 meters, respectively. In these examples, it can be seen how adjusting the tolerance criterion affects the final approximated DSM. For example FIG. 8A's tolerance criterion is relatively low and too many pixels are invalidated such that a large number of bare earth areas end up being interpolated by the hole filler algorithm. FIG. 8C's tolerance criterion is relatively high and not enough artifacts have been removed. For example, a building 230 is clearly visible. FIG. 8B is somewhere between these two extremes and provides a more accurate approximation of the DSM than either FIG. 8A or 8C.

Figure 9:
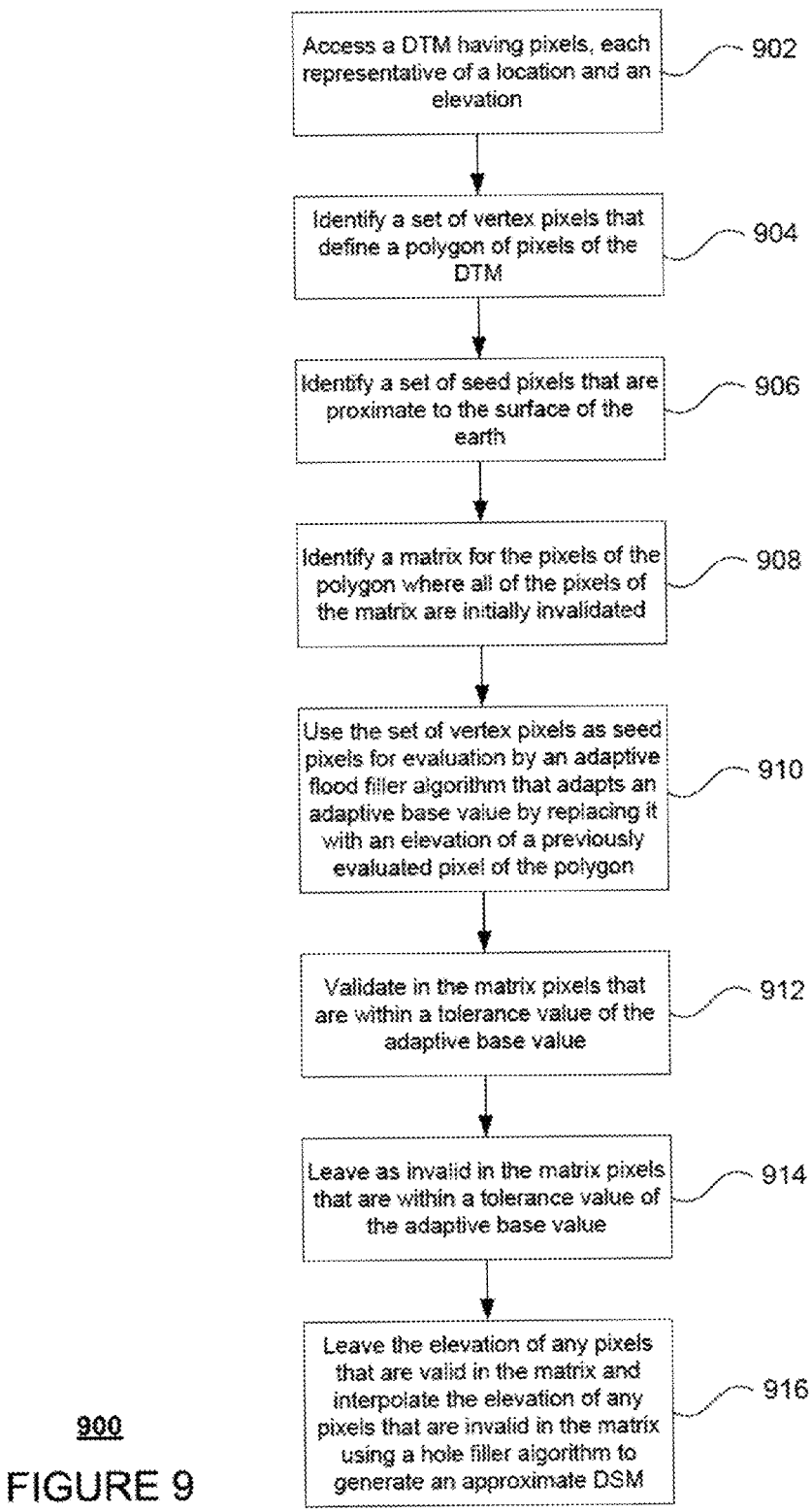
FIG. 9 is an example flow diagram in accordance with aspects of the subject matter described herein.

Flow diagram 900 of FIG. 9 depicts an example of some of the aspects described above performed by computer 110. For example, at block 902, a DTM is accessed. The DTM has pixels, and each pixel is representative of a location and an elevation. At block 904, a set of vertex pixels that define a polygon of pixels of the DTM is identified. At block 906, a set of seed pixels that are proximate to the surface of the earth are identified. Again, these seed pixels may include the vertex pixels. At block 908, a matrix for the pixels of the polygon is identified. Initially, all of the pixels of the matrix are invalid. At block 910, the set of vertex pixels are used as seed pixels for evaluation by an adaptive flood filler algorithm that adapts an adaptive base value by replacing it with an elevation of a previously evaluated pixel of the polygon. Evaluated pixels that are within a tolerance criterion of the adaptive base value are validated in the matrix at block 912, while evaluated pixels that are within a tolerance criterion of the adaptive base value are left as invalid at block 914. In order to generate an approximation of a DSM, the elevation of pixels that are validated in the matrix is unchanged, while the elevation of any pixels that are invalid in the matrix are interpolated using a hole filler algorithm at block 916.

In the examples described herein, the matrix is initialized with all pixels set to false or invalid and subsequently validated, however, a matrix as used herein may be initialized with all pixels set to true or valid and subsequently invalidated using the same processes. Thus, the invalidated pixels may be those that are within the tolerance elevation of their neighbor pixel. Validated pixels may then be processed using the hole-filler algorithm as described above.

The operations described in the Background discussion above may lack the ability to adapt to the terrain underneath artifacts. While these systems are sufficient for removing buildings and trees on a flat terrain, they are less useful when the terrain is hilly or sloped. The adaptive flood filler process can follow up and down gradients, with their accepted steepness being defined by the tolerance value. That allows the flood filler algorithm to follow gently sloped terrain, up or down, while stopping at hard edges and the hole-filler algorithm to remove of individual artifacts or groups of artifacts (houses, vegetation, cars, etc.) in hilly terrain. This process may be most beneficial in areas that are generally flat or gently sloped with few hard edges in the terrain and the hard edges are either man made or stem from vegetation (both of which are to be removed). This allows for an efficient solution to an often occurring problem in terrain editing.

As these and other variations and combinations of the features discussed above may be utilized without departing from the subject matter defined by the claims, the foregoing description of the embodiments should be taken by way of illustration rather than by way of limitation of the subject matter defined by the claims. It will also be understood that the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings may identify the same or similar elements.

The invention claimed is:

1. A method comprising:
    accessing, by one or more processors, a digital surface model including a plurality of pixels, each pixel of the plurality of pixels including location information and elevation information;
    identifying, by the one or more processors, a set of vertex pixels defining a polygon include a subset of pixels of the plurality of pixels;

identifying, by the one or more processors, —a matrix of the subset of pixels, wherein each pixel of the matrix is initially invalidated;

identifying, by the one or more processors, —a set of seed pixels proximate to a surface of the earth;

starting at a neighboring pixel of each seed pixel of the set of seed pixels, evaluating, by the one or more processors, the subset of pixels, wherein evaluating the subset of pixels includes:

when the elevation of a previously evaluated pixel of the subset of pixels is within a tolerance criterion of an elevation of a neighboring pixel of the previously evaluated pixel of the subset of pixels, validating the neighboring pixel of the previously evaluated pixel of the subset of pixels in the matrix by changing the neighboring pixel of the previously evaluated pixel of the subset of pixels in the matrix from invalidated to validated; and when the elevation of a previously evaluated pixel of the subset of pixels is not within a tolerance criterion of an elevation of a neighboring pixel of the previously evaluated pixel of the subset of pixels, leaving the neighboring pixel of the previously evaluated pixel of the subset of pixels as invalidated in the matrix; and after evaluating the subset of pixels, generating, by the one or more processors, an approximation of a digital terrain model based on the matrix.

2. The method of claim 1, wherein the subset of pixels are evaluated using a flood filler algorithm.

3. The method of claim 1, wherein generating the digital surface model includes, subsequent to evaluating the subset of pixels, interpolating the elevation of any invalidated pixels of the matrix.

4. The method of claim 1, wherein a particular pixel's neighboring pixel is directly adjacent to the particular pixel and not diagonally adjacent to the particular pixel.

5. The method of claim 1, wherein the subset of pixels are evaluated in straight lines beginning with each vertex pixel of the set of vertex pixels and once a pixel of the straight line is left as invalidated in the matrix, leaving the remaining pixels that are both of the straight line and the subset of pixels as invalidated in the matrix.

6. The method of claim 1, wherein generating the digital surface model includes, subsequent to evaluating the subset of pixels, using a flood filler algorithm to interpolate any pixels of the matrix that are invalidated to generate a digital surface model.

7. The method of claim 1, further comprising, adjusting the tolerance criterion to increase the number of pixels that are validated in the matrix.

8. The method of claim 1, further comprising, adjusting the tolerance criterion to decrease the number of pixels that are validated in the matrix.

9. The method of claim 1, wherein the set of seed pixels is identified from the set of vertex pixels.

10. The method of claim 1, further comprising validating the pixels of the set of seed pixels in the matrix.

11. A system comprising:

memory storing a digital surface model including a plurality of pixels, each pixel of the plurality of pixels including location information and elevation information;

one or more processors configured to access the memory and to:

identify a set of vertex pixels defining a polygon include a subset of pixels of the plurality of pixels;

identify a matrix of the subset of pixels, wherein each pixel of the matrix is initially invalidated;

identify a set of seed pixels proximate to a surface of the earth;

starting at a neighboring pixel of each seed pixel of the set of seed pixels, evaluate the subset of pixels, wherein evaluating the subset of pixels includes:

when the elevation of a previously evaluated pixel of the subset of pixels is within a tolerance criterion of an elevation of a neighboring pixel of the previously evaluated pixel of the subset of pixels, validate the neighboring pixel of the previously evaluated pixel of the subset of pixels in the matrix by changing the neighboring pixel of the previously evaluated pixel of the subset of pixels in the matrix from invalidated to validated; and when the elevation of a previously evaluated pixel of the subset of pixels is not within a tolerance criterion of an elevation of a neighboring pixel of the previously evaluated pixel of the subset of pixels, leave the neighboring pixel of the previously evaluated pixel of the subset of pixels as invalidated in the matrix; and after evaluating the subset of pixels, generate an approximation of a digital terrain model based on the matrix.

12. The system of claim 11, wherein the processor is further configured to evaluate the subset of pixels using a flood filler algorithm.

13. The system of claim 11, wherein the processor is further configured to generate the digital surface model by, subsequent to evaluating the subset of pixels, interpolating the elevation of any invalidated pixels of the matrix.

14. The system of claim 11, wherein a particular pixel's neighboring pixel is directly adjacent to the particular pixel and not diagonally adjacent to the particular pixel.

15. The system of claim 11, wherein the processor is further configured to evaluate the subset of pixels in straight lines beginning with each vertex pixel of the set of vertex pixels and once a pixel of the straight line is left as invalid in the matrix, leaving the remaining pixels that are both of the straight line and the subset of pixels as invalidated in the matrix.

16. The system of claim 11, wherein the processor is further configured to generate the digital surface model by, subsequent to evaluating the subset of pixels, using a flood filler algorithm to interpolate any pixels of the matrix that are invalidated to generate a digital surface model.

17. The system of claim 11, wherein the processor is further configured to adjust the tolerance criterion to increase the number of pixels that are validated in the matrix.

18. The method of claim 11, wherein the processor is further configured to identify the set of seed pixels from the set of vertex pixels.

19. The method of claim 11, wherein the processor is further configured to validate the pixels of the set of seed pixels in the matrix.

20. A non-transitory, tangible computer-readable storage medium on which computer readable instructions of a program are stored, the instructions, when executed by one or more processors, cause the one or more processors to perform a method, the method comprising:

accessing a digital surface model including a plurality of pixels, each pixel of the plurality of pixels including location information and elevation information;

identifying a set of vertex pixels defining a polygon include a subset of pixels of the plurality of pixels;

identifying a matrix of the subset of pixels, wherein each pixel of the matrix is initially invalidated;

identifying a set of seed pixels proximate to a surface of the earth;

starting at a neighboring pixel of each seed pixel of the set of seed pixels, evaluating, by a processor, the subset of pixels, wherein evaluating the subset of pixels includes:
when the elevation of a previously evaluated pixel of the subset of pixels is within a tolerance criterion of an elevation of a neighboring pixel of the previously evaluated pixel of the subset of pixels, validating the neighboring pixel of the previously evaluated pixel of the subset of pixels in the matrix by changing the neighboring pixel of the previously evaluated pixel of the subset of pixels in the matrix from invalidated to validated; and
when the elevation of a previously evaluated pixel of the subset of pixels is not within a tolerance criterion of an elevation of a neighboring pixel of the previously evaluated pixel of the subset of pixels, leaving the neighboring pixel of the previously evaluated pixel of the subset of pixels as invalidated in the matrix; and
after evaluating the subset of pixels, generating an approximation of a digital terrain model based on the matrix.

* * * * *